United States Patent [19]
Gilchrist

[11] 3,922,212
[45] Nov. 25, 1975

[54] CATHODIC ELECTRODEPOSITION OF SURFACE COATINGS AND COMPOSITIONS THEREFOR
[75] Inventor: Allan E. Gilchrist, Westlake, Ohio
[73] Assignee: SCM Corporation, Cleveland, Ohio
[22] Filed: Feb. 24, 1971
[21] Appl. No.: 118,571

Related U.S. Application Data
[63] Continuation of Ser. No. 662,866, Aug. 24, 1967, abandoned.

[52] U.S. Cl. .............................................. 204/181
[51] Int. Cl.² .................. C25D 13/06; C25D 13/10
[58] Field of Search ...................................... 204/181

[56] References Cited
UNITED STATES PATENTS
3,575,909   4/1971   Gilchrist ............................ 204/181
3,598,774   8/1971   Hartzell et al. ..................... 204/181

Primary Examiner—Howard S. Williams
Attorney, Agent, or Firm—Merton H. Douthitt; James B. Wilkens

[57] ABSTRACT

This patent application sets forth an improvement in process for electrocoating a cathode with a composition maintained in a bath of aqueous medium characterized specially in that said bath is compounded with an aqueous dispersion of a polymeric tertiary amino alkanol ester of a polycarboxylic acid and stabilized with a strong acid. Also set forth are novel tertiary amino alkanol esters of various classes of polycarboxylic acid polymers, specifically alkyd resins, fatty acid polymers, specialty copolymers containing acrylic or like acid and additional functionality, and adducts of dibasic acyclic olefinic acids or their anhydrides, and replenishment compositions of the polymeric tertiary amino alkanol esters that are specially compounded for simultaneously replenishing the ester content of and retarding accumulation of strong acid in an operating bath.

1 Claim, No Drawings

CATHODIC ELECTRODEPOSITION OF SURFACE COATINGS AND COMPOSITIONS THEREFOR

This application is a continuation of co-pending application Ser. No. 662,866, filed Aug. 24, 1967, and now abandoned.

In one aspect this invention relates to an improvement in process for electrocoating a cathode with a coating composition in an electrical circuit comprising a bath of aqueous medium in electrical contact with an anode and a cathode. The improvement comprises compounding the bath with a dispersion of a polymeric tertiary amino alkanol ester of a polycarboxylic acid, the dispersion being stabilized with a strong acid, and passing direct electric current through said circuit at a potential sufficiently high to electrodeposit said ester from said bath onto said cathode.

The key to the good performance of this operation is the property of this particular class of ester to change especially markedly, upon contact with the charged cathode, from a stably dispersed state (e.g., typically a solute in clear aqueous solution, and, in any case, ostensibly a cationic polyelectrolyte capable of carrying electric current) in the aqueous bath to an apparently molecular deposit which is manifestly water resistant (e.g., virtually water-insoluble for practical purposes) and which has a relatively high specific electrical resistivity. To be especially readily dispersible in water with a strong acid, the ester advantageously should have at least about 0.05 gram equivalent of ionizable tertiary amino nitrogen per hundred grams of ester, and preferably at least about 0.1 gram equivalent, whereby the aqueous dispersions can be established and maintained homogeneously with little or no mechanical mixing. If, however, hydroxylated substances are incorporated into the ester structure, e.g., an hydroxy alkyl acrylic or methacrylic acid unit, etc., or into the bath, e.g., 2-alkoxy ethanol-1, glycols, monoalkyl ethers of diethylene glycol, etc., stable aqueous dispersions can be maintained at slightly lower levels of ionizable tertiary amino nitrogen in the ester.

The action of the strong acid appears to be that of ionizing the dispersed ester so that the ester in ionized state in the bath behaves as a polyelectrolyte. By "strong acid" what is meant is an acid having dissociation constant of its first hydrogen at 25° C., at least about as high as that of acetic acid. The suitable strong acids should not be strongly oxidizing (like nitric acid) for the most controllable performance, and corrosion considerations would require corrosion-resistant materials of construction if many otherwise suitable acids were to be used, e.g., dichloroacetic, sulfuric, hydrochloric, etc. The preferred ionizing acid for stabilizing the dispersion is phosphoric acid $H_3PO_4$, which can be used in clean steel equipment at ordinary operating temperatures. It should be noted that the ionizing acid preferably has a low vapor pressure and hence is substantially non-fugitive, because the electrical action occurring removes it adequately from the cathode zone to yield a durable cathode ester deposit without evaporation of ionizing acid from the deposit. However, fugitive (i.e., easily volatilized) ionizing acids such as acetic can be used if desired.

It has been found that in use the bath becomes depleted much faster of the ester than of the ionizing acid and the bath pH can go down to levels where efficient operation is very difficult if not impossible. While anion exchange, dialysis, or electrodialysis of the bath mixture can be used to reduce the accumulation of ionizing acid as the cathodic electrocoating operations progress, it is much more practical to make a mixture comprising a diluent such as an organic liquid (e.g., an alkoxyl alkanol, an alkanol, a ketone, a normally liquid hydrocarbon or mixture of them having boiling point up to about 400° F., or a mixture of same) and/or water and the ester wherein the concentration of the ester in the mixture is substantially above that of the bath and the concentration of ionizing acid in the mixture is substantially below that of the bath, then to replenish the bath with this mixture which simultaneously supplements the faster-depleting ester and utilizes the ionizing acid accumulation in the bath to ionize the supplementing ester. This replenishment composition can, if desired, be compounded with pigments, fillers, resinous extenders, driers, dyes, antifoam agents, and any or all of the other consumed components to keep the coating composition of the bath substantially constant in a desired range of concentration and pH, e.g., ½ to 20 percent by weight total solids and pH of about 1.5 to 5.5. Suitably the replenishment composition will have at least about 25 weight percent solids (N.V.M.) and, on a strictly diluent and ester basis, generally will contain about 5–70 parts of diluent per 95–30 parts of ester, the preponderance of the diluent being water.

It has also been found that the ostensibly electrolytic deposition of the polymeric ester is slower than the collateral electrodeposition of pigments (including mineral fillers), structurally non-ionic or substantially non-ionized resins (under the conditions of deposition), and other typically lyophobic colloids dispersed in the bath with the ester. When considered in bulk at d.c. voltages of 25 to 250, the ester moves roughly 70–80 percent as fast as such pigment or the like. Hence the ester-to-pigment weight ratio in the resulting cathodic deposit is significantly lower than the corresponding ratio of the bath suspension. To prevent the deposition of chalky, resin-starved appearing films, we prefer to keep the weight ratio of polymeric ester to pigment at least about 2:1 in the bath when there is little or no other resinous binder agent present for the cathode deposit, and to make up the bath with an aqueous replenishment composition of the above-mentioned type having polymeric ester-to-pigment weight ratio of at least about 1.5:1, said weight ratio being less than the weight ratio of polymeric ester to pigment in the bath, and substantially the same as that in the film being deposited. Where a structurally nonionic or substantially nonionized resin that is film-forming on or before curing with the polymeric ester is to be codeposited, we can lower the polymeric ester-to-pigment weight ratio in the bath somewhat, e.g., about 1.5:1 or even lower, say about 1:1, and still get good films because of the extra pigment binding action obtained from said nonionized resin after curing has taken place.

The electrodeposition is done with direct (undirectional) current. In most cases such current ordinarily is rectified AC current having about a 5 to 15 percent ripple factor. However, the current can have a greater or lesser ripple factor, or even can be half wave rectified alternating current, and so on, providing the net effect is unidirectional and thus the current direct current. Useful voltages across the bath can be as low as 15 or even lower, and should not be so high as to "burn" through the deposited coating. Practical maximum deposition voltages are 350–500 volts for many resinous systems, although higher voltages can be used with selected systems, particularly if the duration of the higher voltage period is very short.

The cathode deposit can be simply the ester or can include codeposited resins, conventional driers, or finely ground pigment and/or filler bound by the depositing ester or a mixture of the ester and the codeposited resin or resins. The deposit can be tinted if desired, and be considered broadly analogous to enamel, varnish, lacquer, or paint. Preferably the pigments or other solid particles to be codeposited with the ester are extremely fine, e.g., having average particle size not substantially in excess of two microns for pigments having density of 3.5 or more, and average particle size approaching about five microns when the pigments are less dense. If as much as about 5 percent and preferably not more than about 2 percent by weight of the solid pigments, fillers, and codepositing resins are above 10 microns particle size, this can be tolerated without substantial sacrifice in performance, but virtually nothing should be coarser than about 44 microns for good suspension in the bath and good film appearance.

Where the esters are to be blended with other resinous or plasticizing materials for codeposition, suitable materials for such blending include amino aldehyde resins such as melamine resins or urea formaldehyde resins, phenolic resins, and materials that will blend with or are soluble in the ester resin by itself or in the presence of solvents such as alkoxy alkanols. Also appropriate for codeposition are: butadiene-styrene latices, vinyl chloride and vinlyidine chloride homopolymer and copolymer latices, polyolefin resins, fluorocarbon resins, bis-phenol glycidyl ether resins, dicyclodiepoxy carboxylate resins, diolefinic petroleum resin dispersions, resinous polyols, and resinous polyols esterified with carboxylic acids such as monocarboxylic acids, film plasticizers such as dioctylphthalate, and the like.

Those that are normally solid at deposition temperature but readily fusible, including dicyclodiepoxy carboxylate resins, polyethylene resins, polyvinyl chloride resins, certain phenol formaldehyde resins such as those modified with rosin, powdered chlorinated hydrocarbon waxes, epichlorohydrin-bisphenol type epoxy resins advantageously having molecular weight about 1000 or higher to resist hydrolysis in the bath, chlorinated rubber, vinyl acetate-vinyl chloride copolymers, and mixtures of same can be melted and coalesced with the ester at a force curing temperature of 300° to 400° F. Some extenders, particularly hexamethylol melamine and the like, can be considered as assisting in curing in some cases for producing harder or tougher films. Also appropriate for codeposition with the ester are the water-resistant acid resins described in connection with the preformed polycarboxylic acid polymers below, said acid resins being, for codeposition, dissolved in the polymeric ester with or without the use of an auxiliary organic solvent such as 2-butoxy ethanol-1, methyl ethyl ketone, a normally liquid hydrocarbon customarily used as a paint thinner, etc.

There are several ways of making the tertiary amino alkanol ester for cathodic deposition. In one method the appropriate tertiary amino alkanol is simply reacted with a preformed polycarboxylic acid polymer (under esterifying conditions with the removal of water) until the Acid Number of the resulting product is fairly low, e.g., 0 to about 25. Preferably, for efficiency and economy, any substantial excess of amino alkanol is stripped off for recovery. For most efficient deposition it appears that the number of ionizable tertiary amino nitrogen sites of the resulting polymeric ester product should predominate over the number of free carboxylic acid sites. Such preparation is similar to that employed for esterifying lauric, oleic, and stearic acids with N, N-dimethyl ethanolamine for use in cationic flotation processes. Typical carboxylic acid polymers useful in this type of synthesis for the instant purposes are: unsaturated fatty acid polymers such as so-called "dimer" of fatty acids (that is, dimers of linoleic, linolenic, oleic, sorbic, palmitoleic, humoceric, eicosinic, and like acids and their mixtures, said dimers usually also containing a small amount of unsaturated fatty acid trimer); alkyd resins, particularly those having Acid Number between about 5 and 100, broadly the reaction products of a polyol with a polycarboxylic acid, often suitably extended with a fatty acid, a siccative oil such as tung oil, soya oil, or the like, often suitably having minor proportions of monobasic acid reacted therein to terminate chain length where desired; acidic hydrocarbon film-forming polymers such as those made from maleinized copolymers comprising a conjugated diene, e.g., butadiene and diisobutylene, butadiene and mesityl oxide, etc.; adducts of acyclic olefinic acids or anhydrides to a compound having olefinic unsaturation, e.g., siccative hydrocarbon-containing polymers such as conjugated diene-containing polymers or coupled siccative oils such as linseed, sunflower, safflower, corn, tung, soya, and the like, the olefinic double bonds in the oil being conjugated or non-conjugated or a mixture, the coupling agent being preferably maleic anhydride but also crotonic acid, citraconic acid or anhydride, or fumaric acid; such coupled oils further reacted under anhydrous conditions with 2–25 percent of a vinyl monomer such as styrene or vinyl toluene; these coupled oils as such or as further reacted with such vinyl monomer, or a maleinized hydrocarbon film-forming polymer, which has been extended at elevated temperature with an oil soluble, non-heat reactive phenolaldehyde resin to unite the resins securely; unsaturated fatty acids similarly coupled; styrene-maleic acid adducts; and preformed acrylic and vinyl polymers and copolymers having carboxylic acid groups contributed by $\alpha, \beta$ unsaturated carboxylic acids or residues of these acids. Advantageously the viscosity at 20° C. or the polycarboxylic acid polymer for best film formation should be at least about "G" on the Gardner-Holdt scale, preferably above 10,000 cps., and it can go substantially higher, e.g., $Z_6$.

Suitable tertiary amino substituted alkanols for this esterification include dimethylaminoethanol, triethanolamine, dimethylaminopropanol, triisopropanolamine, methyl diethanolamine, and N-phenyl diethanolamine, and dimethyl-N-(2 aminoethyl) diethanolamine. The alkanol basis of this material is a tertiary amino substituted $C_{1-4}$ alkanol, most suitably such substituted ethanol for availability and economy. Where there is a single alcohol functionality for esterification, the remaining substituents on the tertiary amino nitrogen most generally are lower alkyl, that is, $C_{1-4}$, for efficiency and economy, but can be up to $C_8$ hydrocarbyl radicals, e.g., phenyl, alkenyl, alkyl, or the nitrogen can even be a member of a substituted pyridyl structure. One or more tertiary amino groups, as distinguished from a primary or a secondary amino group, are essential to achieve the very marked cathodic transformation that is especially desired for electrodeposition and to resist aminolysis when the substituted alkanol is esterified with a polycarboxylic acid polymer.

Another way to make a suitable ester for this cathodic deposition is to copolymerize a tertiary aminoalkyl acrylate or methacrylate, or similar acrylic monomer with other vinyl and/or acrylic substances such as styrene, acrylate esters or lower alkyl substituted acrylate esters and the like, the resulting copolymers being referred to generally herein as "vinyl copolymers." Aqueous acid-soluble copolymers obtained this way have been compounded with aqueous acetic acid to give wax-like floor dressings which precipitate a film when ionizing acid evaporates. Typical commercially available tertiary amino acrylate monomers for such preparation include: t-butylaminoethyl methacrylate; dimethylaminoethyl methacrylate; and diethylaminoethyl acrylate. Such copolymers are made especially suitable for the instant purposes by including in their structure 2–15 percent by weight of (a) a hydroxy-substituted lower alkyl ester of acrylic acid, e.g., methacrylic acid, and/or (b) a methylol acrylamide, suitably made by reacting acrylamide with formaldehyde, then if desired, etherifying such reaction product with a lower alkanol such as methanol.

Another way to make a suitable ester for this deposition is to react a polybasic carboxylic acid with a tertiary amino alkanol having a plurality of esterifiable hydroxyl groups, e.g., methyl diethanolamine with phthalic anhydride to yield a linear polymer, with trimellitic anhydride to yield a more complex polymer, etc.

The resulting ester product for electrodeposition suitably can be described as polymeric by virtue of using a preformed polycarboxylic acid for the esterification, by copolymerizing a tertiary amino alkyl acrylate with various vinyl and/or acrylic substances, or by reacting simpler polybasic carboxylic acids with amines having a multiplicity of esterifiable hydroxyl sites. The average molecular weight of the ester can be as low as several hundred on up to about 100,000, advantageously about 500 to 10,000, and preferably about 1,000–2,000 for filming. The polymeric material deposited either by itself or with codeposited additional resinous materials, plasticizers, etc. should be film-forming, preferentially at bath temperature not exceeding about 200° F. and certainly at forced curing temperature (upwards to about 450° F.) where protective surface coatings are desired.

In any of the above preparations there must be sufficient tertiary amino alkanol functionality in the resulting polymeric ester to ionize with the strong acid and get good stable dispersion in water, typically at least about 0.05 gram equivalent per hundred grams of the resulting ester. If the resulting ester is so high in ionizable tertiary amino groups that, while it disperses in water extremely readily, it becomes inefficient for depositing practical films electrically, the simplest remedy for this is to cut down on the proportion of ionizing acid and ionize only enough of the tertiary amino groups to achieve good, stable, aqueous dispersion and the desired electrical deposition characteristics. In the absence of pigments and extraneous materials preferred esters suitably ionized yield a clear solution in water. Useful ionizing acids include phosphoric, pyrophosphoric, maleic, acetic, citric, fumaric, oxalic, sulfuric, hydrochloric, brombenzoic, chlorobenzoic, and chloroacetic. Practical operating temperature of a bath is between about 60° and 110° F.

The following examples show ways in which the invention has been practiced, but should not be construed as limiting it. Unless otherwise indicated, all parts are parts by weight and all temperatures are degrees Fahrenheit.

EXAMPLE 1

The esterification product of linseed dimerized fatty acids (having Acid Number about 190) with dimethyl ethanolamine, said ester having Acid Number of 26, is neutralized with 10% phosphoric acid basis resin (ester) solids, and the product then dissolved in water to form a 5% resin solids solution having the following characteristics: pH 2.7; specific resistivity at 80° of 644 ohm-centimeters; solution light amber, somewhat cloudy, but clearing upon addition of more phosphoric acid.

The solution is held at 80° in a tank having immersed therein a cathode plate wired to an anode plate through an external circuit. Voltage between anode and cathode is held at 100 volts D.C. (rectified alternating current) for 60 seconds and yields a deposit of 0.4415 grams of ester on the cathode plate, the coulombs per gram of ester deposited being 91. The area around the anode clears during the operation, indicating accumulation of phosphoric acid in this area. The resulting cathodic deposit is substantially insoluble in water and very slightly acidic in character, and withstands rinsing with water. It is force dried at 350° for 20 minutes to yield a soft, protective deposit. Any unesterified amine remaining in the deposit would be removed in the baking operation.

EXAMPLE 2

The same operation as Example 1 is done, except that hexamethylol melamine resin is also mixed in the aqueous baths to give a total of 7½ to 20 percent resinous solids (N.V.M.) therein. The resulting deposits, when force cured in an oven for 20 minutes at 350°, produce a somewhat harder film. A similar effect is secured when a urea-formaldehyde resin is blended with the ester, and the combination codeposited and cured in this way.

EXAMPLE 3

A copolymer is made by polymerizing 25 parts of styrene, 60 parts of butyl acrylate, and 15 parts of dimethylaminoethyl methacrylate in the presence of 20 parts of 2-butoxy ethanol-1 and 2.5 parts of dicumyl peroxide catalyst. The resinous ester, with the 2-butoxy ethanol-1 unseparated, is treated with an equal weight of 10% aqueous phosphoric acid, then further thinned with water until the dispersed ester concentration is reduced to 5 percent. The ester than is electrically applied to a cathode from the dispersion in the manner of Example 1, rinsed and force-cured at 350° for 20 minutes to yield a clear but somewhat tacky film.

Similar runs are made wherein ethyl acrylate is used in the copolymer instead of butyl acrylate. The resulting product is somewhat harder and does not flow as well before or during curing. In other runs using the ethyl acrylate-containing copolymer various amounts of auxiliary curing agents, hexamethoxymelamine and urea formaldehyde resin, are codeposited and cured.

The dilute aqueous phosphoric acid bath solution of the polymeric ester can be the vehicle for a low concentration of dissolved zinc phosphate salt. Upon cathodic electrodeposition of the ester the phosphoric acid concentration in the cathode zone is sharply reduced, thus reducing also the capacity of the bath in this zone to be a solvent for the zinc phosphate. Hence, special corrosion protection, e.g., on steel, would be expected from coprecipitation of zinc phosphate with the polymeric ester on the cathode and electrolysis of zinc metal onto the cathode. Additionally, where acid sites on the polymeric ester or resin codepositing therewith are reactive with zinc ions, additional zinc would be expected to be laid down.

EXAMPLE 4

A copolymer is made by reacting 25 parts styrene, 50 parts butyl acrylate, 10 parts hydroxypropyl methacrylic acid and 15 parts of dimethylaminoethyl methacrylate in the presence of 20 parts of 2-butoxyethanol-1 and 2.5 parts of dicumyl peroxide catalyst. The resulting product, with the solvent unseparated, disperses in water with phosphoric acid somewhat easier than the corresponding copolymer made without the hydroxypropyl methacrylic acid in the preceding example. It electrodeposits very well when cathodically applied and cured in the manner of Example 1.

This product is also compounded with titanium dioxide and clay pigments in the ratio of about 2.7 weight parts of ester resin per part of the pigments, the mixture reduced with water to 5 percent by weight N.V.M. to yield a bath having 440 ohm-centimeters electrical resistivity and pH of 2.5. The pigmented material is used to electrocoat a metal cathode at 100 volts for one minute at 80° F., the coulombs per gram being 119. Upon force curing a pigmented film results.

The pigmented film deposits in a weight ratio of about 2 parts of polymeric ester (copolymer resin) per part of pigment. A replenishment composition is made of the solvent-containing product and the pigments in this ratio, and it is added to and blended with the bath, together with a small amount of water, as the solids content of the bath dips below about 4% N.V.M. during succeeding electrocoating operations to restore original volume and solids content.

Somewhat harder cured films result when an aminoplast resin such as hexamethoxymelamine resin is codeposited in minor proportion with the pigmented mixture, and the polymeric ester content of the film and replenishment composition can be reduced in view of the pigment binding action of the aminoplast on curing.

In place of at least a portion of the hydroxypropyl methacrylic acid for making the copolymer one can use acrylamide, then react the copolymerized amide sites with formaldehyde dissolved in butanol and toluene, heating to remove water and returning butanol and toluene until methylol acrylamide functionality is developed in the copolymer, for improved water dispersibility.

When a copolymer like the first one of this Example is made, except that the butyl acrylate is increased by 5 parts and the dimethylaminoethyl methacrylate is cut by 5 parts, the resulting tertiary amino alkanol ester has about a borderline ionizable tertiary amino nitrogen content for stable aqueous dispersion with strong acid and good electrodeposition by itself. Again, when a similar copolymer is made wherein the butyl acrylate is raised to 60 parts and the dimethylaminoethyl methacrylate is lowered to 5 parts, the product has inadequate water dispersibility with strong acid to be practical for cathodic electrocoating by itself.

EXAMPLE 5

Ordinarily base-solubilized alkyd resins dissolved in water at pH of 7½–10 tend to hydrolyze in time and deteriorate. The following water soluble "amino alkyd," dissolved in an aqueous solution of phosphoric acid like the polymeric ester of Example 1, resists such deterioration and can be electrodeposited like the ester of Example 1: the reaction product of 4 mols of dehydrated castor oil fatty acids, 4 mols of triethanolamine, and 3 mols of phthalic anhydride reacted to an Acid Number of 12. Such resin deposit cures to a soft film. A harder film can be developed when 2 molar parts of trimellitic anhydride are substituted for 3 mol parts of phthalic anhydride in the resin cook.

EXAMPLE 6

Phthalic anhydride and methyl diethanolamine are esterified in approximately equimolar proportion to yield a linear polymer which forms a clear 5 percent resin solids solution for cathodic electrodeposition in water when treated with phosphoric acid and the resulting solution subjected to electrolysis like the aqueous resin polymeric ester dispersion of Example 1.

This linear polymer also can be mixed with up to approximately one-third of its weight of an alkyd resin made by reacting, with the withdrawal of water, 48 parts of safflower oil fatty acids, 32 parts of phthalic anhydride, 4.9 parts of pentaerythritol, and 14.8 parts of glycerine to an Acid Number of 9 and blending into said alkyd ½ part of cobalt naphthenate drier containing 6% by weight cobalt. The resulting resinous mixture can be reduced with water and 10 percent by weight aqueous phosphoric acid solution to dissolve the linear polymer and suspend the alkyd therein at a 5 percent by weight N.V.M. concentration, and the mixture cathodically deposited in the manner of the operation shown in Example 1.

EXAMPLE 7

A mixture of 86 parts of linseed oil and 14 parts of maleic anhydride are heated for 3 hours at 450° F. then cooled to 200° F. The resulting coupled oil is esterified with N,N-diethylethanolamine to yield an almost completely esterified resin having Acid No. of 20. When treated with phosphoric acid and reduced with water like the esterification product of Example 1, the product yields a stable electrocoating bath for depositing a cathodic film in the manner of Example 1.

In the foregoing electrodepositions the immersed part of steel cathodes is coated very well at about ½–1 mil thickness, and very evenly on all immersed surfaces. The coatings resist water washing. Previously proposed electrodepositions of resins having various and distinguishable amino functionality onto cathodes are shown, for example, in South African Pat. No. 635,534 of Dec. 1963 and U.S. Pat. No. 2,345,543 of Mar. 28, 1944.

As previously mentioned, useful voltages in the present operation can be from about 15 volts up to 350 and higher in some cases, provided, however, that the film is not ruptured because of heat generated with large amperage flows. The bath for ordinary service is a tank of paint dispersion in which the cathode is immersed for electrocoating, then removed. However, with special equipment designs the electrocoating can be done by spraying the aqueous bath dispersion onto the cathodic part, provided that the spray makes a continuous stream which carries the necessary direct electric current. Dipping of the cathode is preferred for reaching remote surfaces most simply, the techniques being essentially the same as have been proposed previously for dipping anodes for electrocoating. The cathodes can be rinsed, before or after coating, with water or aqueous bath dispersion, dipped with power off or on, coated at substantially constant amperage or at substantially constant voltage, and removed from the bath with power off or on.

I claim:

1. In a process for electrocoating a cathode in an electrical circuit comprising a bath of aqueous medium in electrical contact with said cathode and with an anode, wherein said bath comprises a dispersion of a polymeric tertiary aminoalkanol ester of a polymeric carboxylic acid in intimate admixture with pigment, said dispersion being stabilized by ionization of said ester with an acid at least as strong as acetic acid, said process comprising passing a direct current through said circuit at a potential sufficiently high to electrodeposit said ester and said pigment from said bath as a coating on said cathode, the improvement which comprises supplementing the solids content of said bath, to prevent substantial depletion thereof by electrodeposition therefrom upon said cathode, with a supplementing composition comprising an intimate mixture of:

a. pigment having an average particle size not substantially in excess of 2 microns for pigments having a density of 3.5 or more and an average particle size not substantially in excess of 5 microns for pigment having a density of less than 3.5, said pigment having a particle size distribution wherein not more than about 5 percent by weight of said pigment has a particle size above about 10 microns and said pigment remaining particulate when the resulting electrodeposit is cured, and b. polymeric tertiary aminoalkanol ester, the concentration of said ester in said supplementing composition being substantially above that in said bath and the weight ratio of said ester to said pigment in said supplementing composition being substantially the same as the weight ratio of said ester to said pigment in the coating being deposited and at least about 1.5:1 and from about 70 to about 80 percent of the weight ratio of said ester to said pigment in said bath when the electrodeposition potential is in the range of about 25 to about 250 volts, the concentration of ionizing acid in said supplementing composition being substantially below that in said bath, whereby the composition of said bath is maintained substantially constant by simultaneously supplementing said ester and said pigment in substantially the ratio in which they are removed from said bath by electrodeposition while utilizing the ionizing acid accumulated in said bath to ionize the supplementing ester added to said bath in said supplementing composition.

* * * * *